(12) United States Patent
Xiao et al.

(10) Patent No.: US 10,161,303 B2
(45) Date of Patent: Dec. 25, 2018

(54) SYSTEMS AND METHODS FOR GENERATING AUXILIARY TORQUE

(71) Applicant: Ford Global Technologies, LLC, Dearborn, MI (US)

(72) Inventors: Baitao Xiao, Canton, MI (US); Adam Nathan Banker, Canton, MI (US); Hamid-Reza Ossareh, Livonia, MI (US); Jonathan Edward Caine, South Woodham Ferrers (GB)

(73) Assignee: Ford Global Technologies, LLC, Dearborn, MI (US)

( * ) Notice: Subject to any disclaimer, the term of this patent is extended or adjusted under 35 U.S.C. 154(b) by 164 days.

(21) Appl. No.: 15/204,731

(22) Filed: Jul. 7, 2016

(65) Prior Publication Data

US 2018/0010529 A1 Jan. 11, 2018

(51) Int. Cl.
| | |
|---|---|
| *F02B 39/10* | (2006.01) |
| *F02B 39/12* | (2006.01) |
| *F02D 23/00* | (2006.01) |
| *F02D 41/26* | (2006.01) |
| *F02D 41/14* | (2006.01) |
| *F02P 5/04* | (2006.01) |
| *F02P 5/153* | (2006.01) |
| *F02D 41/00* | (2006.01) |

(52) U.S. Cl.
CPC .............. *F02B 39/10* (2013.01); *F02B 39/12* (2013.01); *F02D 23/00* (2013.01); *F02D 41/0007* (2013.01); *F02D 41/1497* (2013.01); *F02D 41/26* (2013.01); *F02P 5/045* (2013.01); *F02P 5/153* (2013.01); *F02D 2200/1012* (2013.01); *F02D 2250/21* (2013.01)

(58) Field of Classification Search
CPC ...... F02B 39/10; F02B 37/14; F02D 41/0007; F02D 23/00
USPC .................................. 123/559.1, 565; 60/607
See application file for complete search history.

(56) References Cited

U.S. PATENT DOCUMENTS

| | | | | |
|---|---|---|---|---|
| 4,882,905 | A | * 11/1989 | Kawamura | ............. F02B 37/10 290/52 |
| 6,445,982 | B1 | 9/2002 | Swales et al. | |
| 6,588,256 | B2 | 7/2003 | Gassner et al. | |
| 6,609,505 | B2 | * 8/2003 | Janson | .................... F02B 33/40 123/559.1 |
| 6,705,084 | B2 | 3/2004 | Allen et al. | |
| 7,000,601 | B2 | * 2/2006 | Yasui | ...................... F02B 33/32 123/559.3 |
| 7,351,183 | B2 | 4/2008 | Fujii et al. | |
| 7,503,875 | B2 | 3/2009 | Fujii et al. | |

(Continued)

FOREIGN PATENT DOCUMENTS

CN 201856623 U 6/2011

*Primary Examiner* — Lindsay Low
*Assistant Examiner* — Robert Werner
(74) *Attorney, Agent, or Firm* — Julia Voutyras; McCoy Russell LLP

(57) ABSTRACT

Systems and methods for generating auxiliary torque are provided. In one example, a method for controlling a supercharger comprises, responsive to requested torque exceeding spark authority of an engine, varying a current applied to a motor of the supercharger to provide an amount of torque to a crankshaft of the engine. In this way, a supercharger can be controlled to compensate for an engine torque shortfall.

20 Claims, 6 Drawing Sheets

(56) References Cited

U.S. PATENT DOCUMENTS

| | | | |
|---|---|---|---|
| 7,650,219 B2* | 1/2010 | Livshiz | F02D 11/105 701/101 |
| 7,801,661 B2 | 9/2010 | Masterson et al. | |
| 8,087,401 B2* | 1/2012 | Inoue | F02B 33/40 123/559.1 |
| 8,328,688 B2 | 12/2012 | Fujii et al. | |
| 8,337,361 B2 | 12/2012 | Fujii et al. | |
| 8,529,405 B2 | 9/2013 | Fujii et al. | |
| 8,529,406 B2 | 9/2013 | Fujii et al. | |
| 8,636,613 B2 | 1/2014 | Teslak et al. | |
| 8,775,044 B2 | 7/2014 | Teslak et al. | |
| 8,808,141 B2 | 8/2014 | Shelton et al. | |
| 9,133,761 B2* | 9/2015 | McDonald-Walker | B60K 6/24 |
| 9,567,922 B2* | 2/2017 | Lofgren | B60K 6/24 |
| 9,797,300 B2* | 10/2017 | Lofgren | F02B 37/14 |
| 9,856,782 B2* | 1/2018 | McDonald-Walker | F02B 33/40 |
| 2002/0096156 A1* | 7/2002 | Palazzolo | F02B 39/04 123/559.1 |
| 2006/0196183 A1* | 9/2006 | Isogai | F02B 39/10 60/607 |
| 2012/0216770 A1 | 8/2012 | Brun | |
| 2013/0232971 A1 | 9/2013 | Miazgowicz et al. | |
| 2014/0100733 A1 | 4/2014 | Christ | |
| 2014/0369803 A1 | 12/2014 | Crisp et al. | |
| 2015/0152780 A1* | 6/2015 | Dale-Jones | F02B 39/04 417/411 |
| 2015/0377158 A1* | 12/2015 | Benjey | F02B 39/10 701/22 |
| 2016/0047298 A1* | 2/2016 | Lofgren | F02B 37/14 60/273 |

* cited by examiner

SYSTEMS AND METHODS FOR GENERATING AUXILIARY TORQUE

FIELD

The present description relates to systems and methods for a supercharger, and more specifically, to controlling a supercharger to generate auxiliary torque.

BACKGROUND AND SUMMARY

In response to requested changes in torque output by an engine, spark timing may be adjusted to affect the desired change in torque. For example, for a decrease in requested torque, the engine is able to provide the decreasing torque by retarding spark timing. Similarly, for an increase in requested torque, the engine can provide the increasing torque by advancing spark timing.

However, the authority over torque provided by spark timing adjustments, or spark authority, may be limited by combustion instability limits, exhaust temperature limits, minimum timing for best torque (MBT), and so on. Such limitations depend on operating conditions, such as load, engine speed, exhaust temperature, throttle position, and so on, and are obtained from an engine mapping. Further, spark retard increases exhaust temperature which in turn restrains spark authority. As an example, during low-speed, high-load operating conditions, the available spark authority is low due to high combustion instability and knock propensity. As a result, an amount of spark authority for a request of spark timing adjustments may be insufficient to achieve a requested torque output.

The inventors herein have recognized the above-mentioned disadvantages and have developed systems and methods to at least partially address these issues. Specifically, methods and systems for controlling a supercharger to generate auxiliary torque are provided. In one example, a method for controlling a supercharger comprises, responsive to requested torque exceeding spark authority of an engine, varying a current applied to a motor of the supercharger to provide an amount of torque to a crankshaft of the engine. In this way, a supercharger can be controlled to compensate for an engine torque shortfall.

In another example, a system comprises: an engine; a supercharger including a compressor, an epicyclic gear train coupled to the compressor, a first motor coupled to the engine and further coupled to the epicyclic gear train, and a second motor coupled to the epicyclic gear train; and a controller configured with instructions in non-transitory memory that when executed cause the controller to vary a current applied to a motor of the supercharger to generate a torque applied to at least one component of the system via a mechanical belt. In this way, a supercharger can be controlled to provide auxiliary torque for an engine when spark authority is limited.

Further, the cyclical variation that results from firing events in an internal combustion engine causes vibrations that travel through the drivetrain, causing gear rattle and exciting frequencies in the vehicle. In yet another example, a method for controlling a supercharger comprises applying a cyclical current to a motor of the supercharger, the motor coupled to an ancillary device via a mechanical belt. In this way, a supercharger can be controlled to mitigate torque transients, thereby reducing noise, vibration, and harshness (NVH).

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
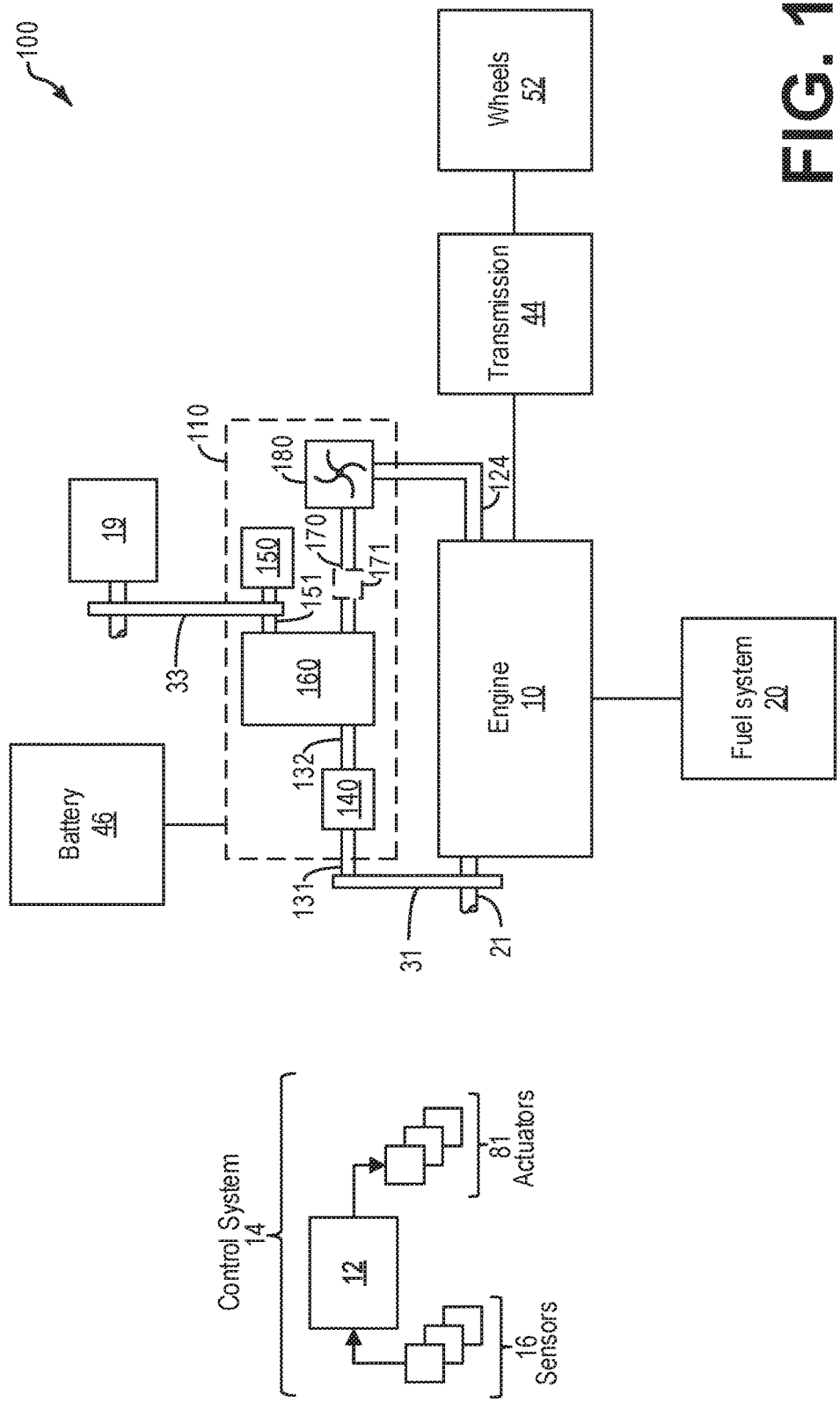
FIG. 1 shows a block diagram illustrating a vehicle including a supercharger incorporated into a powertrain of the vehicle.
Figure 2:
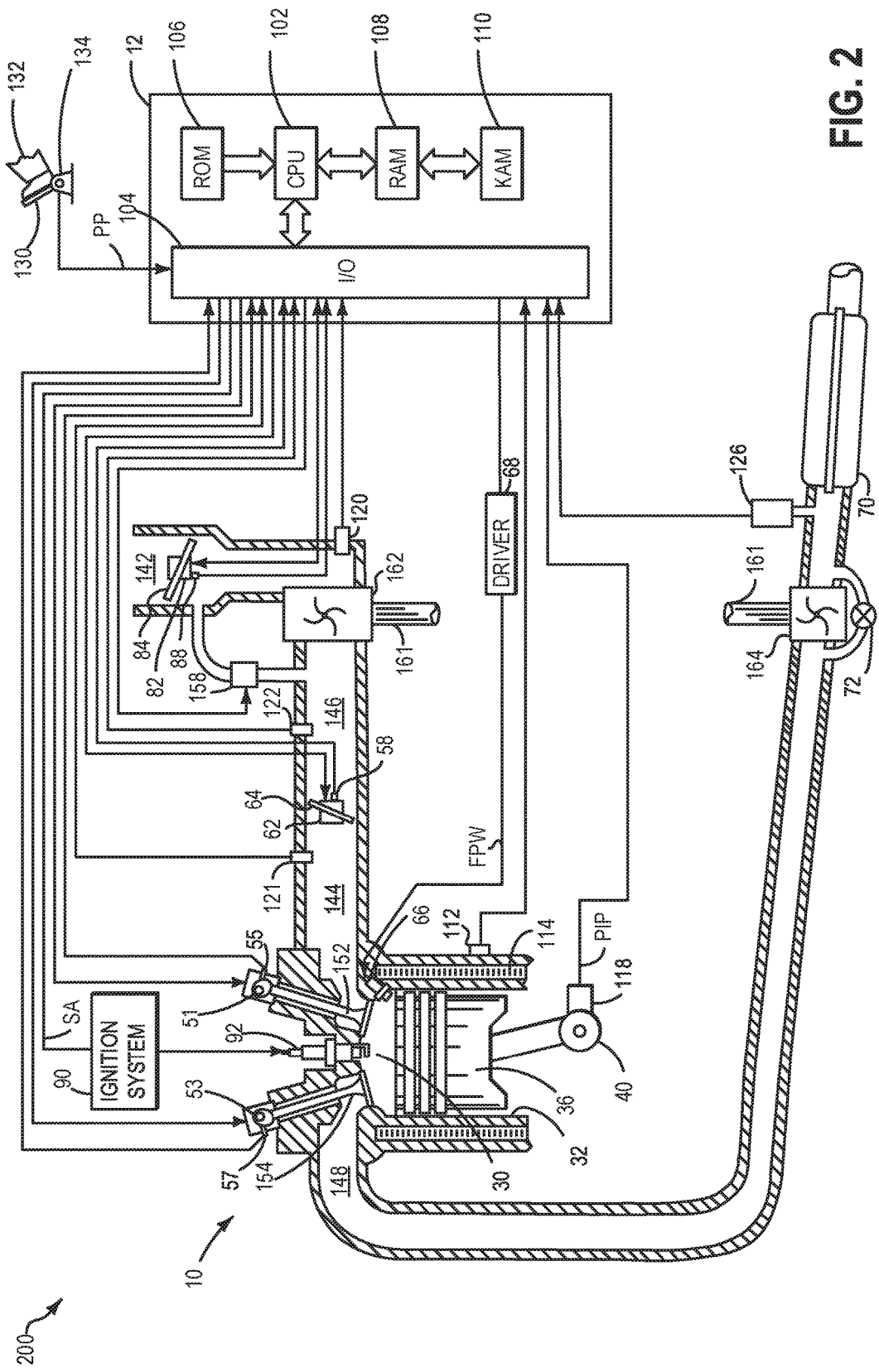
FIG. 2 shows a block diagram illustrating a vehicle system.
Figure 3:
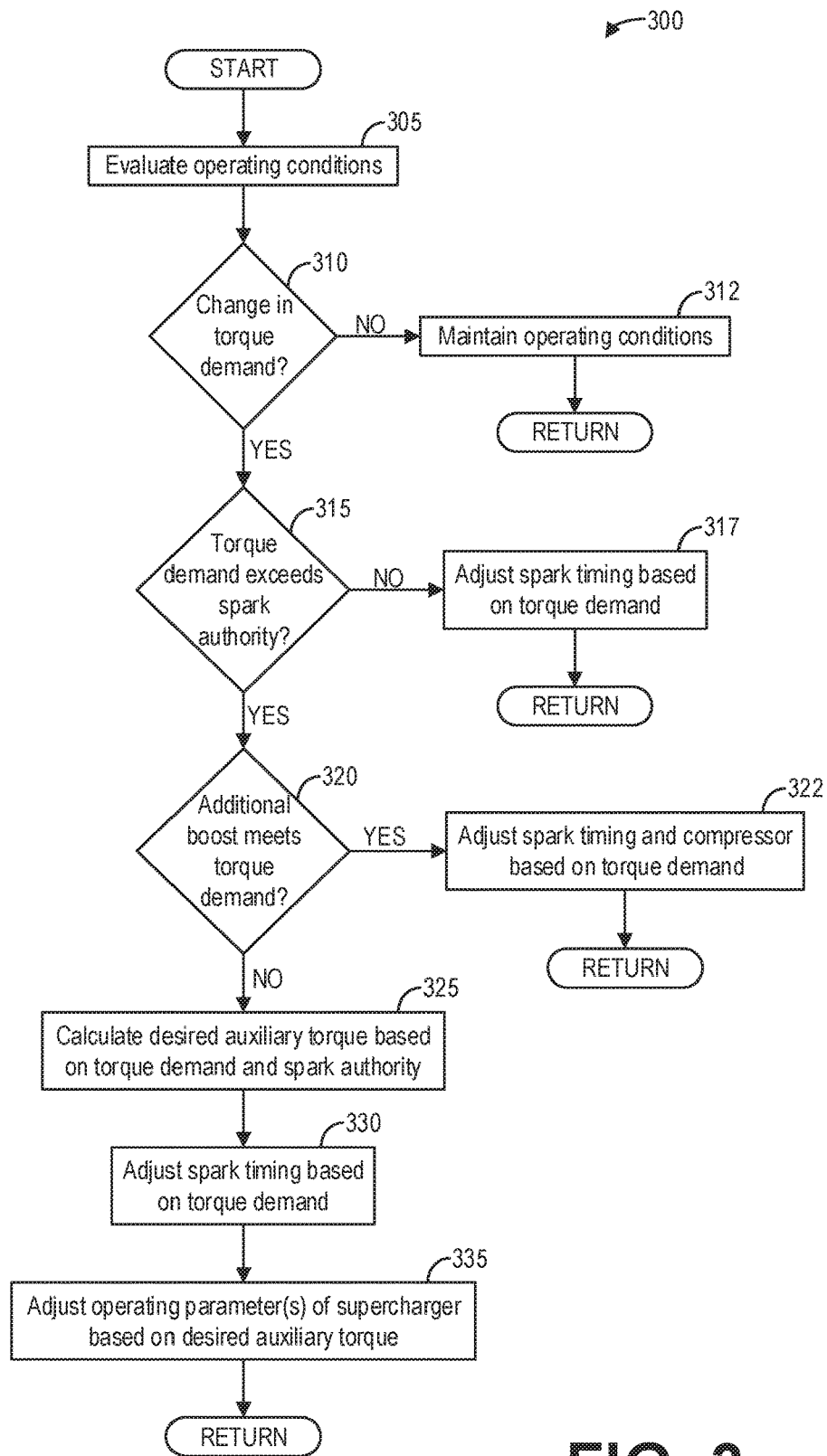
FIG. 3 shows a high-level flow chart illustrating an example method for controlling a supercharger to provide auxiliary torque.
Figure 4:
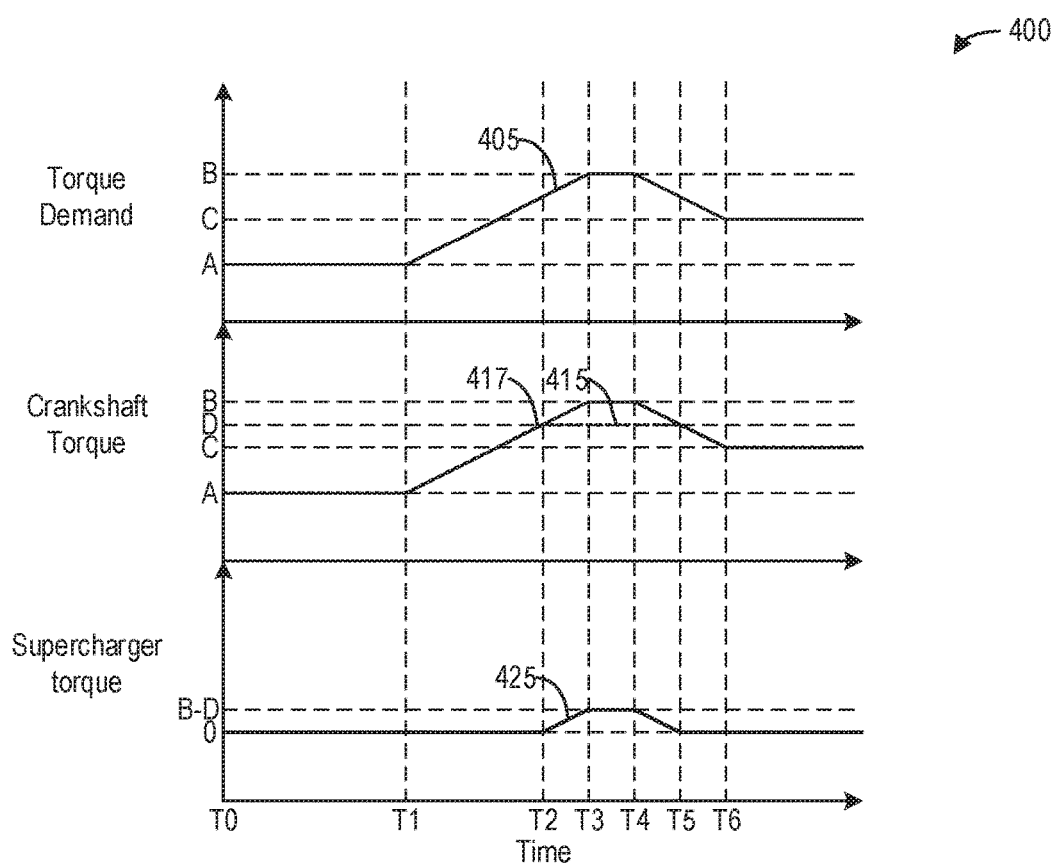
FIG. 4 shows an example operating sequence according to the method of FIG. 3.
Figure 5:
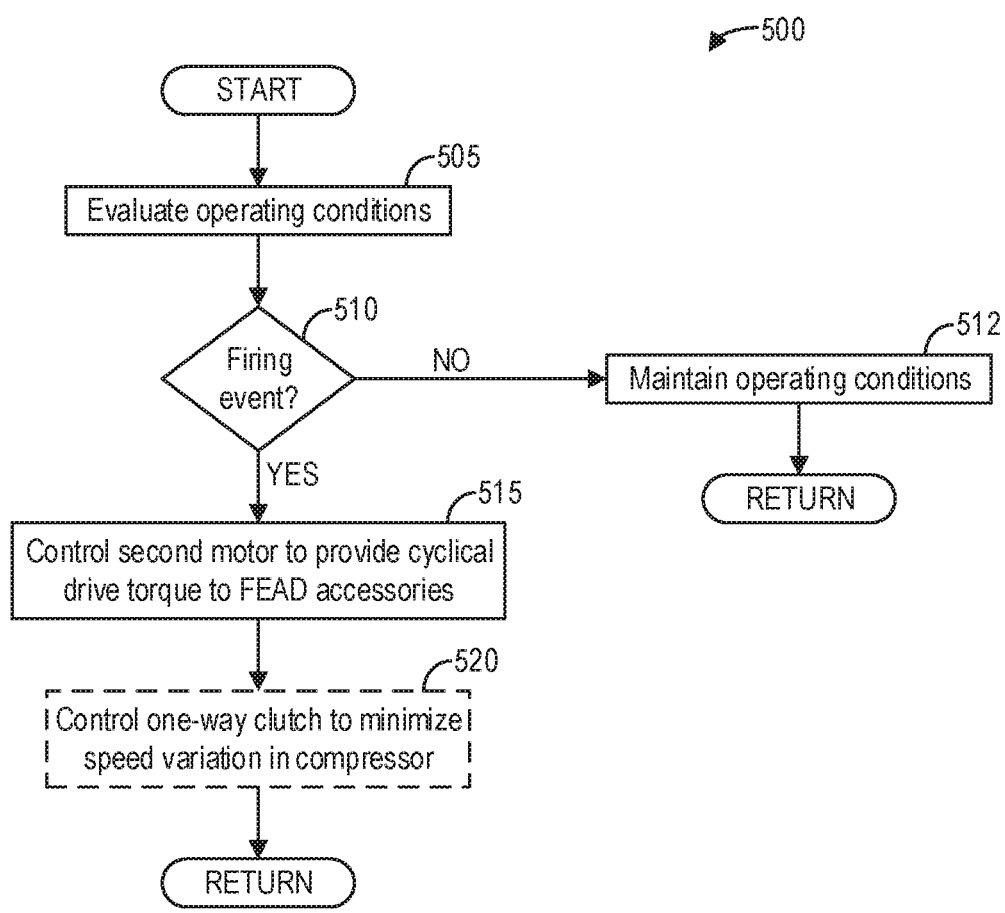
FIG. 5 shows a high-level flow chart illustrating an example method for controlling a supercharger to provide cyclic auxiliary torque.
Figure 6:
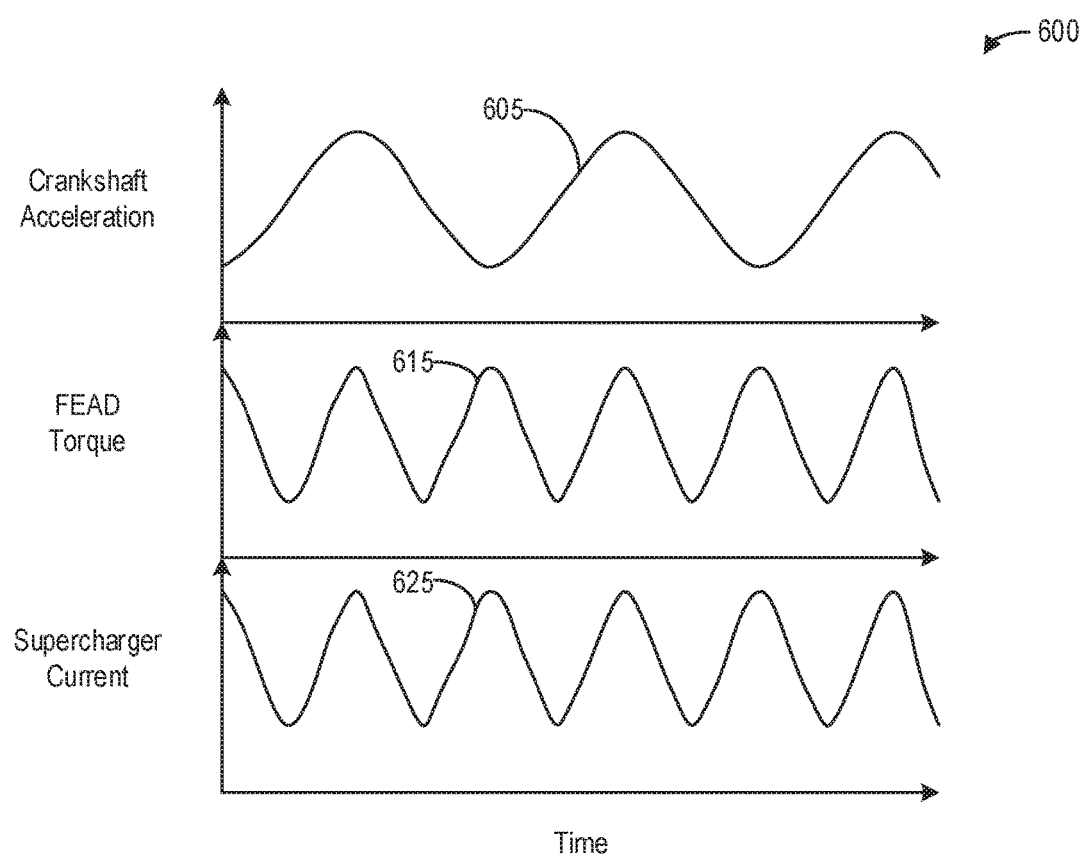
FIG. 6 is an example operating sequence according to the method of FIG. 5.

The present description is related to a supercharger. Specifically, methods and systems for controlling a supercharger to generate auxiliary torque and mitigate torque transients are provided. The supercharger may include an epicyclic gear train and two motors to provide a full variable transmission (distinct from the transmission coupling the engine to the vehicle wheels), and may be incorporated into a vehicle system as shown in FIGS. 1-2. The supercharger may be controlled to increase spark authority by providing auxiliary torque to an engine crankshaft, as depicted in FIG. 3. An example timeline for providing auxiliary torque is shown in FIG. 4. The supercharger may also be controlled to provide cyclical torque to FEAD devices and thereby to absorb torque transients from the engine, as shown in FIG. 5. An example timeline for providing cyclical torque is shown in FIG. 6.

FIG. 1 shows a schematic diagram of vehicle system 100 including a supercharger 110 fitted to an engine 10. The vehicle system 100 further includes an energy storage device or battery 46, a transmission 44, wheels 52, fuel system 20, one or more ancillary devices 19, and a control system 14.

An input shaft 131 of the supercharger 110 is mechanically coupled to the crankshaft 21 of the engine 10 via belt 31. Although not shown, the inlet of the compressor 180 is connected to draw air via an air filter as known in the art. It should be noted, however, that in some embodiments, the input shaft 131 of the supercharger 110 may be coupled to the crankshaft 21 by any suitable coupling. For example, a gear drive arrangement may be used.

The supercharger 110 is also mechanically coupled to an ancillary device 19 via belt 33 to provide a front-end accessory drive (FEAD). The mechanically-driven ancillary device may be a water pump, power steering pump, vacuum pump, air pump, or other mechanically driven device (e.g., FEAD devices).

The supercharger 110 includes a first motor-generator 140 and a second motor-generator 150 housed in a housing of the supercharger 110. The supercharger 110 further includes an epicyclic gear train 160 provided between the two motor generators 140, 150. The input shaft 131 of the supercharger 110 is coupled to the rotor (not shown) of the first motor generator 140. The rotor of first motor generator 140 is further coupled to the annulus (not shown) of the epicyclic gear grain 160 via shaft 132. In some examples, the shaft 132 and the input shaft 131 comprise a same shaft. The carrier (not shown) of the epicyclic gear train 160 is coupled to the rotor (not shown) of the second motor generator 150 via shaft 151. As depicted, the belt 33 coupled to the FEAD or ancillary device 19 is coupled to the supercharger 110 via the shaft 151.

The output shaft 170 of the supercharger 110 is coupled to the sun wheel (not shown) of the epicyclic gear train 160 and the compressor 180. As one example, the output shaft 170 may be coupled to the impellor (not shown) of the compressor 180. In some examples, the shaft 151 may be hollow such that the shaft 170 may extend therethrough to the compressor 180. At the output end of the supercharger 110, the output of the compressor 180 is connected to an intake manifold 124 of the engine 10.

In some examples, the speed of the first motor generator 140 is fixedly linked to engine speed, while the second motor generator 150 is free to rotate relative to the first motor generator 140 and the engine 10. If the second motor generator 150 and the carrier to which it is coupled are stationary, the epicyclic gear train 160 acts to rotate the sun gear and hence the output shaft 170 and the impellor of the compressor 180 more quickly than the annulus, and hence more quickly than the input shaft 131, the first motor generator 140, and the engine 10 to which the annulus is coupled. If, however, the second motor generator 150 is operated to rotate in a direction opposite to that of the first motor generator 140, the epicyclic gear train 160 acts to rotate the impellor even more quickly. If the second motor generator 150 is operated to rotate in the same direction as that of the first motor generator 140, the epicyclic gear train 160 acts to rotate the impellor more slowly. Thus, the second motor generator 150 can be used to increase or decrease the speed of the impellor relative to the speed of the input shaft 131 and hence the engine 10, and thereby to vary the pressure of air in the inlet manifold 124, also known as the boost pressure.

Alternatively, in some examples, as described further herein with regard to FIGS. 3-4, the first motor generator 140 may be driven to provide auxiliary torque to the crankshaft 21 of the engine 10 via belt 31. In other examples, as described further herein with regard to FIGS. 5-6, the second motor generator 150 may be driven to mitigate torque transients. In such examples, the supercharger 110 may include a one-way clutch 171 on the output shaft 170 to selectively engage or disengage the epicyclic gear train 160 from the compressor 180, for example to avoid pulsating of the airflow in the inlet manifold 124 when controlling the second motor generator 150 to mitigate torque transients.

Further, the supercharger 110 may be coupled to the battery 46 of the vehicle and may be configured to charge the battery 46 during engine operation. For example, the supercharger 110 may be configured to convert the mechanical energy generated while running engine 10 to electrical energy for storage in battery 46. In this way, the supercharger 110 may function as a generator and/or an alternator/starter of the vehicle system 100.

Engine 10 is coupled to transmission 44. Transmission 44 may comprise a manual transmission, automatic transmission, or combinations thereof. Transmission 44 may include a gear set having a plurality of gears. Further, various additional components may be included, such as a torque convertor, a final drive unit, and so on. Transmission 44 is shown coupled to drive wheels 52, which may contact a road surface.

The vehicle system 100 further includes a control system 14. Control system 14 is shown receiving information from a plurality of sensors 16 (various examples of which are described at FIG. 2) and sending control signals to a plurality of actuators 81 (various examples of which are described at FIG. 2). As one example, sensors 16 may include various pressure and temperature sensors, a fuel level sensor, various exhaust gas sensors, torque sensors, and so on. The control system 14 may also send control signals to the actuators 81 based on input received from a vehicle operator and the plurality of sensors 16. The various actuators may include, for example, the transmission, transmission gears, cylinder fuel injectors, an air intake throttle coupled to the engine intake manifold, the first motor generator 140, the second motor generator 150, the epicyclic gear train 160, and so on. The control system 14 may include a controller 12. The controller may receive input data from the various sensors or buttons, process the input data, and trigger the actuators in response to the processed input data based on instructions or code programmed therein corresponding to one or more routines. Example control routines are described herein with regard to FIGS. 3 and 5.

The internal combustion engine 10 is further described with regard to FIG. 2, which shows a block schematic diagram illustrating a vehicle system 200 including the engine 10. Internal combustion engine 10, comprising a plurality of cylinders, one cylinder of which is shown in FIG. 2, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated independently with respect to valves of other cylinders via intake cam 51 and an exhaust cam 53. Intake valve adjuster 85 advances or retards the phase of intake valve 52 relative to a position of crankshaft 40. Additionally, intake valve adjuster 85 may increase or decrease an intake valve lift amount. Exhaust valve adjuster 83 advances or retards the phase of exhaust valve 54 relative to a position of crankshaft 40. Further, exhaust valve adjuster 83 may increase or decrease an exhaust valve lift amount. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Intake manifold 44 is shown communicating with optional electronic throttle 62 which adjusts a position of throttle plate 64 to control air flow from boost chamber 46 to intake manifold 44. In some examples, throttle 62 and throttle plate 64 may be positioned between intake valve 52 and intake manifold 44 such that throttle 62 is a port throttle.

Compressor 162 supplies air from air intake 42 to boost chamber 46. Compressor 162 is driven by shaft 161 which is mechanically coupled to turbine 164. Compressor bypass valve 158 may be selectively operated to reduce boost pressure. Waste gate 72 may be selectively opened and closed to control the speed of turbine 164.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of turbine 164 and catalytic converter 70. Alternatively, a two-state exhaust gas oxygen sensor may be substituted for UEGO sensor 126. Converter 70 can include multiple catalyst bricks, in one example. In another example, multiple emission control devices, each with multiple bricks, can be used. Converter 70 can be a three-way type catalyst in one example.

Controller 12 is shown in FIG. 2 as a conventional microcomputer including: microprocessor unit 102, input/output ports 104, read-only (non-transitory) memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of engine manifold pressure (MAP) from pressure sensor 121 coupled to intake manifold 44; a measurement of boost pressure from pressure sensor 122; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC).

In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative intake and exhaust valve opening overlap, late intake valve closing, or various other examples.

Driver demand torque may be determined from a position of accelerator pedal 130 as sensed by accelerator pedal sensor 134. A voltage or current indicative of driver demand torque is output from accelerator pedal sensor 134 when driver's foot 132 operates accelerator pedal 130.

In response to changes in driver demand torque, spark timing may be advanced or retarded to affect the desired change in torque. For example, for a decrease in driver demand torque, the engine is able to provide the decreasing torque by retarding spark timing. However, the authority over torque provided by spark timing, or spark authority, may be insufficient to achieve the requested torque change. The amount of spark authority for any request of spark retard/advance may be limited by, as non-limiting examples, combustion instability limits, exhaust temperature limits, and minimum timing for best torque (MBT). Further, spark retard increases exhaust temperature which in turn restrains spark authority. During low-speed, high-load operating conditions, the available spark authority is low due to high combustion instability and knock propensity. As described further herein with regard to FIG. 3, a method for compensating for a shortfall in torque due to limitations of spark authority includes controlling a supercharger to provide auxiliary torque.

FIG. 3 shows a high-level flow chart illustrating an example method 300 for providing auxiliary torque according to an embodiment. In particular, method 300 relates to controlling a supercharger to achieve a demanded torque when spark authority is limited. Method 300 will be described herein with reference to the components and systems depicted in FIGS. 1 and 2, though it should be understood that the method may be applied to other systems without departing from the scope of this disclosure. Method 300 may be carried out by controller 12, and may be stored as executable instructions in non-transitory memory.

Method 300 begins at 305. At 305, method 300 includes evaluating operating conditions. Operating conditions may include, but are not limited to, engine speed, spark timing, exhaust temperature, torque demand, accelerator pedal position, engine load, and so on. Operating conditions may be measured by one or more sensors 16 coupled to controller 12, or may be estimated or inferred based on available data.

Continuing at 310, method 300 includes determining if there is a change in torque demand. In one example, torque demand may be evaluated at 305 based on a sensed accelerator pedal position, for example, such as the position of the accelerator pedal 130 sensed by accelerator pedal sensor 134 described herein above with regard to FIG. 2, though it should be appreciated that torque demand may additionally or alternatively be based on other operating conditions, such as engine load. In one example, a change in torque demand may comprise an increase or a decrease in torque demand with respect to previous torque demand.

The method may determine that there is no change in torque demand ("NO") if the currently demanded torque is within a threshold range of a previous torque demand, while the method may determine that there is a change in torque demand ("YES") if the currently-demanded torque is outside the threshold range of the previous torque demand. The threshold range may be small such that small variations in torque demand over time may be ignored with regard to the present method. However, in some examples, the method may simply determine if the currently-demanded torque is identical to the previously-demanded torque ("NO"), or if the currently-demanded torque is different at all from the previously-demanded torque ("YES").

If there is no change in torque demand ("NO"), method 300 proceeds to 312. At 312, method 300 includes maintaining operating conditions, such as the operating conditions evaluated at 305. Method 300 may then end or return, for example, to 305. In this way, method 300 may monitor the operating conditions for a change in torque demand.

Referring back to 310, if there is a change in torque demand ("YES"), method 300 proceeds to 315. At 315, method 300 includes determining if the torque demand exceeds spark authority. The amount of spark authority for any request of spark retard/advance may be limited by, as non-limiting examples, combustion instability limits, exhaust temperature limits, and minimum timing for best torque (MBT). Further, spark retard increases exhaust temperature which in turn restrains spark authority. During low-speed, high-load operating conditions, the available spark authority is low due to high combustion instability and knock propensity. Thus, in one example, determining if the torque demand exceeds spark authority comprises determining if the spark timing can be adjusted to achieve the torque demand.

If the torque demand does not exceed spark authority ("NO"), method 300 proceeds to 317. At 317, method 300 includes adjusting spark timing based on the torque demand. For example, the spark timing is adjusted to achieve the demanded torque. Method 300 then ends.

However, referring again to 315, if the torque demand exceeds spark authority ("YES"), method 300 proceeds to 320. At 320, method 300 determines if additional boost will meet the torque demand. For example, if the spark authority is very limited and the shortfall in torque output is imminent, additional charge boosting may not be sufficient to satisfy the torque demand as controlling the compressor to generate the additional boost may be too slow. To meet the torque demand, controlling the supercharger to generate auxiliary torque may be preferable to controlling the supercharger to generate additional boost. However, if the spark authority is not too limited, the compressor may be controlled to generate additional boost in time to meet the torque demand.

Thus, if additional boost will meet the torque demand ("YES"), method 300 proceeds to 322. At 322, method 300 adjusts the spark timing and the compressor to generate additional boost to the engine based on the torque demand. Method 300 then ends.

However, referring again to 320, if additional boost will not meet the torque demand ("NO"), method 300 proceeds to 325. At 325, method 300 includes calculating a desired auxiliary torque based on the torque demand and the spark authority. In one example, the desired auxiliary torque comprises a difference between the total desired torque (i.e., the torque demand) and the maximum available torque from spark retarding/advancing (i.e., the limits of the spark authority).

At 330, method 300 includes adjusting spark timing based on the torque demand. In particular, the spark timing is adjusted to the spark authority limits, beyond which the spark timing may not be further adjusted, in order to provide at least a portion of the demanded torque. In some examples, the spark timing may already be adjusted to the spark authority limits, and so no further adjustment to the spark timing occurs at 330.

At 335, method 300 includes adjusting one or more operating parameters of the supercharger based on the desired auxiliary torque. For example, at 335, the first motor of the supercharger is controlled to provide mechanical torque to the crankshaft of the engine to assist the engine in meeting torque demand. In one example, the controller varies current applied to the first motor such that the first motor generates the desired auxiliary torque.

It should be appreciated that the auxiliary torque generated by the first motor and applied to the crankshaft of the engine may be considered positive or negative. For example, if the torque demand is an increase from current engine torque, the first motor may be controlled to rotate in the same direction as the engine crankshaft such that the first motor provides positive torque (i.e., the auxiliary torque adds to the engine torque). Similarly, if the torque demand is a decrease from current engine torque, the first motor may be controlled to rotate in an opposite direction of the engine crankshaft such that the first motor provides negative torque (i.e., the auxiliary torque subtracts from the engine torque).

In some examples, the method may adjust the gear ratio of the epicyclic gear train of the supercharger such that the first motor applies the auxiliary torque to the crankshaft while the compressor continues to function normally. Thus adjusting one or more operating parameters may further include selectively controlling the gear ratio of the epicyclic gear train of the supercharger.

In some alternative examples, the compressor of the supercharger may be disconnected (e.g., via a one-way clutch 171) from other components of the supercharger (e.g., the epicyclic gear train and the motor generators) while the supercharger is controlled to provide auxiliary torque. Thus adjusting one or more operating parameters may further include selectively disengaging a one-way clutch and/or the epicyclic gear train of the supercharger.

After adjusting operation of the supercharger, method 300 may then return to 305 to continue monitoring for changes in torque demand.

Thus, a method for controlling a supercharger to provide auxiliary torque is disclosed. It should be appreciated that in some examples, the auxiliary torque may only be provided for a short durations to avoid drawing excessive current from the battery.

Though not depicted, it should be appreciated that in some examples, method 300 may include actions wherein the operating conditions of the supercharger are considered. For example, method 300 may further include determining if the first motor of the supercharger is available for providing auxiliary torque to the engine crankshaft prior to calculating desired auxiliary torque. In some examples, the method may not use the supercharger to provide auxiliary torque if the supercharger is not available. Additionally or alternatively, in some examples, for example if the supercharger is supercharging (e.g., the first and second motors are controlled to provide compressed/supercharged air to the engine intake), current operation of the supercharger may be temporarily suspended (e.g., by disengaging the one-way clutch 171) in order to provide the auxiliary torque.

FIG. 4 shows an example timeline 400 for providing auxiliary torque using the method described herein with regard to FIG. 3. Timeline 400 includes plot 405, indicating the torque demand (e.g., the instantaneous amount of torque demanded or requested for vehicle operation) over time. Timeline 400 also includes plot 415, indicating the crankshaft torque (e.g., the instantaneous torque provided by the engine to the transmission) over time. Timeline 400 also includes plot 425, indicating the supercharger torque (e.g., the instantaneous torque provided by the supercharger to the engine crankshaft) over time. The crankshaft torque and the supercharger torque combine to provide a total torque to the transmission. Thus, timeline 400 further includes plot 417, indicating the total crankshaft torque (e.g., the total torque provided to the transmission and generated by the engine and the supercharger) over time.

At time T0, the torque demand is equal to a value A, as indicated by plot 405 of graph 401. Further, the crankshaft torque provided to the transmission is equal to A, as indicated by plots 415 and 417. The coincidence of plots 415 and 417 indicates that the engine generates sufficient torque to meet the torque demand. Thus, the torque provided by the supercharger to the crankshaft is zero, as indicated by plot 425.

From times T1 to T3, the torque demand increases linearly from A to B, as indicated by plot 405. Such an increase in torque demand may be in response to an increased accelerator pedal position, as a non-limiting example. In response, the operation of the engine is adjusted (e.g., spark timing is adjusted) to increase the torque provided by the engine. Thus, from T1 to T2, the crankshaft torque provided by the engine increases from A to D, as indicated by plot 415. However, the torque D is less than the demanded torque B. Thus, at time T2, the torque provided by the engine is insufficient to meet the torque demand indicated by plot 405. To fill this torque deficiency, or torque hole, at time T2 the supercharger is controlled to provide torque to the engine crankshaft, as indicated by plot 425. As depicted, the supercharger torque increases linearly from zero torque to a torque equal to the difference between torque B and torque D (i.e., B-D). Consequently, the total torque provided by the crankshaft to the transmission (the combination of the engine torque indicated by plot 415 and the supercharger torque indicated by plot 425) equals the demanded torque, as indicated by plot 417.

From times T3 to T4, the torque demand is constant and equal to B, as indicated by plot 405. The engine torque is still insufficient for meeting the torque demand, as indicated by plot 415, and so the supercharger continues to provide auxiliary torque to the crankshaft, as indicated by plot 425. Consequently, the total torque provided by the crankshaft to the transmission equals the demanded torque, as indicated by plot 417.

From times T4 to T6, the torque demand decreases from B to C, as indicated by plot 405. The supercharger continues to provide auxiliary torque to the crankshaft to meet the torque demand until the engine torque is sufficient to provide the demanded torque at T5, when the torque demand reaches the value D above which the engine is unable to provide alone due to spark authority limitations.

Thus, from times T4 to T5, the supercharger torque decreases from (B-D) to zero while the engine torque remains constant at D, as indicated by plots 425 and 415, respectively, such that the total torque provided by the crankshaft to the transmission equals the demanded torque, as indicated by plots 417 and 405, respectively.

From times T5 to T6, the engine torque decreases from D to C while the supercharger provides no torque, as indicated by plots 415 and 425, respectively. At time T6, the torque demand levels out to a constant value C, as indicated by plot 405. The engine torque provides the torque demand without auxiliary torque from the supercharger, as indicated by plots 415, 417, and 425, respectively.

Thus, systems and methods are provided for torque hole filling and increasing spark authority. It should be appreciated that the operation sequence depicted in FIG. 4 is exemplary and non-limiting, and is provided to illustrate one example of how a supercharger may be utilized for providing auxiliary torque when spark authority is limited.

FIG. 5 shows a high-level flow chart illustrating an example method 500 for controlling a supercharger to provide cyclic auxiliary torque according to an embodiment. In particular, method 500 relates to controlling a supercharger to mitigate torque transients in ancillary or FEAD devices. Method 500 will be described herein with reference to the components and systems depicted in FIGS. 1 and 2, though it should be understood that the method may be applied to other systems without departing from the scope of this disclosure. Method 500 may be carried out by controller 12, and may be stored as executable instructions in non-transitory memory.

Method 500 begins at 505. At 505, method 500 includes evaluating operating conditions. Operating conditions may include, but are not limited to, engine speed, spark timing, exhaust temperature, torque demand, accelerator pedal position, throttle position, engine load, and so on. Operating conditions may be measured by one or more sensors 16 coupled to controller 12, or may be estimated or inferred based on available data.

At 510, method 500 includes determining if a firing event has occurred. A firing event occurs, for example, when a spark plug ignites fuel in a cylinder. If a firing event has not occurred ("NO"), method 500 proceeds to 512. At 512, method 400 includes maintaining operating conditions. Method 400 then ends.

However, at 510, if a firing event has occurred ("YES"), method 500 proceeds to 515. At 515, method 500 includes controlling a second motor of a supercharger to provide cyclical drive torque to FEAD accessories. In one example, the drive current and frequency provided to the second motor is varied to provide a cyclical drive torque from the mechanical belt. This drive torque is run in phase to the engine power, thereby absorbing power during the peak acceleration and not during the deceleration of the engine. By absorbing mechanical torque during the peak accelerations, the engine variation is smoothed and NVH impact is lowered.

At 520, method 500 optionally includes controlling a one-way clutch to minimize speed variation in the compressor. For example, the one-way clutch 161 of the supercharger 110 may be disengaged such that the cyclical torque provided by the second motor 150 does not affect the compressor 180. Method 500 then ends.

FIG. 6 shows an example timeline 600 for providing auxiliary torque to FEAD devices in accordance with the method of FIG. 5. Timeline 600 includes plot 605, indicating crankshaft acceleration over time. Timeline 600 also includes plot 615, indicating torque provided to FEAD devices over time, and plot 625, indicating current provided to the supercharger over time.

After a firing event, the crankshaft acceleration (e.g., engine acceleration) may be sinusoidal as illustrated by plot 605. The cyclical variation that results from the firing events in the engine cause vibrations that travel through the drivetrain causing gear rattle and exciting frequencies in the vehicle. A cyclical current is provided to the supercharger, for example the current provided by controller 12 to the second motor 150 of the supercharger 110, as indicated by plot 625. The cyclical supercharger current drives the second motor of the supercharger to provide a cyclical torque applied to the FEAD devices, as indicated by plot 615. The cyclical current and subsequently the cyclical torque is driven in phase to the crankshaft acceleration 605 such that the FEAD torque absorbs power during the peak acceleration (e.g., the peaks of plot 605) of the engine and not during the deceleration of the engine.

Thus, systems and methods are provided to control a variable-speed drive mechanism for FEAD devices such that high load components take maximum power during the peak of engine acceleration and a lower amount during the slowing of the engine after the firing event. In one example, the drive mechanism comprises a supercharger as described herein above, though it should be appreciated that any high-torque variable-speed drive device may be used in accordance with the systems and methods described herein without departing from the scope of the present disclosure.

In one embodiment, a method for controlling a supercharger comprises, responsive to requested torque exceeding spark authority of an engine, varying a current applied to a motor of the supercharger to provide an amount of torque to a crankshaft of the engine.

In a first example of the method, the method further comprises calculating an engine torque based on the spark authority, and calculating the amount of torque based on the engine torque and the requested torque. In a second example of the method optionally including the first example, the amount of torque comprises a difference between the requested torque and the engine torque. In a third example of the method optionally including one or more of the first and second examples, the method further comprises adjusting spark timing of the engine to generate the calculated engine torque. In a fourth example of the method optionally including one or more of the first through third examples, the motor is coupled to the engine crankshaft via a mechanical belt. In a fifth example of the method optionally including one or more of the first through fourth examples, the amount of torque provided to the crankshaft combines with torque generated by the engine to provide the requested torque. In a sixth example of the method optionally including one or more of the first through fifth examples, the motor of the supercharger is coupled to an epicyclic gear train of the supercharger, the epicyclic gear train further coupled to a compressor of the supercharger, and the method further comprises selectively disengaging the epicyclic gear train from the compressor while varying the current.

In another embodiment, a method for controlling a supercharger comprises applying a cyclical current to a motor of the supercharger, the motor coupled to an ancillary device via a mechanical belt.

In a first example of the method, the method further comprises applying the cyclical current responsive to a firing event in an engine coupled to the supercharger. In a second example of the method optionally including the first example, the cyclical current is based on torque generated by an engine. In a third example of the method optionally including one or more of the first and second examples, the cyclical current is synchronized in phase with peak accelerations of an engine coupled to the supercharger. In a fourth example of the method optionally including one or more of the first through third examples, the engine is coupled to a first motor of the supercharger, and wherein the motor is coupled to the first motor via an epicyclic gear train of the supercharger. In a fifth example of the method optionally including one or more of the first through fourth examples, the method further comprises selectively disengaging the epicyclic gear train from a compressor of the supercharger while applying the cyclical current to the motor. In a sixth example of the method optionally including one or more of the first through fifth examples, selectively disengaging the epicyclic gear train from the compressor comprises selectively disengaging a one-way clutch between the epicyclic gear train and the compressor.

In yet another embodiment, a system comprises: an engine; a supercharger including a compressor, an epicyclic gear train coupled to the compressor, a first motor coupled to the engine and further coupled to the epicyclic gear train, and a second motor coupled to the epicyclic gear train; and a controller configured with instructions in non-transitory memory that when executed cause the controller to: vary a current applied to a motor of the supercharger to generate a torque applied to at least one component of the system via a mechanical belt.

In a first example of the system, the at least one component of the system comprises a crankshaft of the engine, the motor of the supercharger comprises the first motor, and the mechanical belt couples the first motor to the crankshaft. In a second example of the system optionally including the first example, the controller is further configured with instructions in the non-transitory memory that when executed cause the controller to: responsive to a requested torque, calculate an auxiliary torque based on the requested torque and a spark authority of the engine; and vary the current applied to the first motor based on the calculated auxiliary torque. In a third example of the system optionally including one or more of the first and second examples, the system further comprises an ancillary device, wherein the at least one component of the system comprises the ancillary device, the motor comprises the second motor, and the mechanical belt couples the second motor to the ancillary device. In a fourth example of the system optionally including one or more of the first through third examples, the current applied to the motor comprises a cyclical current in phase with power output of the engine. In a fifth example of the system optionally including one or more of the first through fourth examples, the supercharger further includes a one-way clutch, wherein the epicyclic gear train is coupled to the compressor via the one-way clutch, and wherein the controller further includes instructions in the non-transitory memory that when executed cause the controller to selectively disengage the one-way clutch while varying the current.

The control routines such as described in FIGS. 3 and 5, may be used together and may further include various additional actions. During some conditions, such as lower temperatures of the supercharger's epicyclic transmission (which may be measured by a temperature sensor coupled to the transmission and/or estimated based on other temperature sensors such as engine temperature and air temperature), the method may rely to a greater extent on adjusting the supercharger's transmission ratio as a way to adjust engine crankshaft torque. However, during higher supercharger transmission temperatures, the method may rely to a greater extent on spark adjustments (than transmission ratio adjustments). In this way, the system may still provide desired crankshaft torque control while also reducing potential degrading wear on the supercharger transmission at higher temperatures. Further, lower transmission temperature may likely coincide with lower engine temperatures, thus reducing the potential for knock and enabling greater reliance on spark control.

Note that the example control and estimation routines included herein can be used with various engine and/or vehicle system configurations and the various alternator/starter configurations included herein. The control methods and routines disclosed herein may be stored as executable instructions in non-transitory memory and may be carried out by the control system including the controller in combination with the various sensors, actuators, and other vehicle system hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various vehicle hardware components in combination with one or more controllers.

This concludes the description. The reading of it by those skilled in the art would bring to mind many alterations and modifications without departing from the spirit and the scope of the description. For example, I3, I4, I5, V6, V8, V10, V12, and boxer engines operating in natural gas, gasoline, diesel, or alternative fuel configurations could use the present description to advantage.

The invention claimed is:

1. A method for controlling a supercharger, comprising: responsive to requested torque exceeding spark authority of an engine, varying a current applied to a motor of the supercharger to provide an amount of torque to a crankshaft of the engine.

2. The method of claim 1, further comprising calculating an engine torque based on the spark authority, and calculating the amount of torque based on the engine torque and the requested torque.

3. The method of claim 2, wherein the amount of torque comprises a difference between the requested torque and the engine torque.

4. The method of claim 2, further comprising adjusting spark timing of the engine to generate the calculated engine torque.

5. The method of claim 1, wherein the motor of the supercharger is coupled to the crankshaft via a mechanical belt.

6. The method of claim 1, wherein the amount of torque provided to the crankshaft combines with torque generated by the engine to provide the requested torque.

7. The method of claim 1, wherein the motor of the supercharger is coupled to an epicyclic gear train of the supercharger, the epicyclic gear train further coupled to a compressor of the supercharger, and further comprising selectively adjusting a gear ratio of the epicyclic gear train while varying the current.

8. A method for controlling a supercharger, comprising: applying a cyclical current to a motor of the supercharger, the motor coupled to an ancillary device via a mechanical belt, wherein the motor provides a cyclical torque to the ancillary device via the mechanical belt according to the cyclical current.

9. The method of claim 8, further comprising applying the cyclical current responsive to a firing event in an engine coupled to the supercharger.

10. The method of claim 8, wherein the cyclical current is based on torque generated by an engine.

11. The method of claim 8, wherein the cyclical current is synchronized in phase with peak accelerations of an engine coupled to the supercharger, and wherein the current is further adjusted responsive to a temperature of an epicyclic gear train of the supercharger coupling the supercharger to a crankshaft of the engine.

12. The method of claim 11, wherein the engine is coupled to a first motor of the supercharger, and wherein the motor is coupled to the first motor via the epicyclic gear train of the supercharger.

13. The method of claim 12, further comprising selectively disengaging the epicyclic gear train from a compressor of the supercharger while applying the cyclical current to the motor.

14. The method of claim 13, wherein selectively disengaging the epicyclic gear train from the compressor comprises selectively disengaging a one-way clutch between the epicyclic gear train and the compressor.

15. A system, comprising:
an engine;
a supercharger including a compressor, an epicyclic gear train coupled to the compressor, a first motor coupled to the engine and further coupled to the epicyclic gear train, and a second motor coupled to the epicyclic gear train; and
a controller configured with instructions in non-transitory memory that when executed cause the controller to:
vary a current applied to a motor of the supercharger to generate an auxiliary torque applied to a crankshaft of the engine via a mechanical belt when an engine torque output by the engine reaches a maximum available torque, wherein the auxiliary torque comprises a difference between a requested torque and the maximum available torque.

16. The system of claim 15, wherein the motor of the supercharger comprises the first motor, and the mechanical belt couples the first motor to the crankshaft.

17. The system of claim 16, wherein the controller is further configured with instructions in the non-transitory memory that when executed cause the controller to:
responsive to the requested torque, calculate the auxiliary torque based on the requested torque and a spark authority of the engine; and
vary the current applied to the first motor based on the calculated auxiliary torque.

18. The system of claim 15, further comprising an ancillary device, wherein the controller is further configured with instructions in non-transitory memory that when executed cause the controller to vary a current applied to the second motor to generate a cyclical torque applied to the ancillary device via a second mechanical belt.

19. The system of claim 18, wherein the current applied to the second motor comprises a cyclical current in phase with power output of the engine.

20. The system of claim 18, wherein the supercharger further includes a one-way clutch, wherein the epicyclic gear train is coupled to the compressor via the one-way clutch, and wherein the controller further includes instructions in the non-transitory memory that when executed cause the controller to selectively disengage the one-way clutch while varying the current.

* * * * *